INVENTOR.
Arthur Nutting
BY Arthur Robert
ATTORNEY

April 14, 1959     A. NUTTING     2,881,859
ATMOSPHERIC LINT CONDENSER
Filed Jan. 4, 1953     3 Sheets-Sheet 2
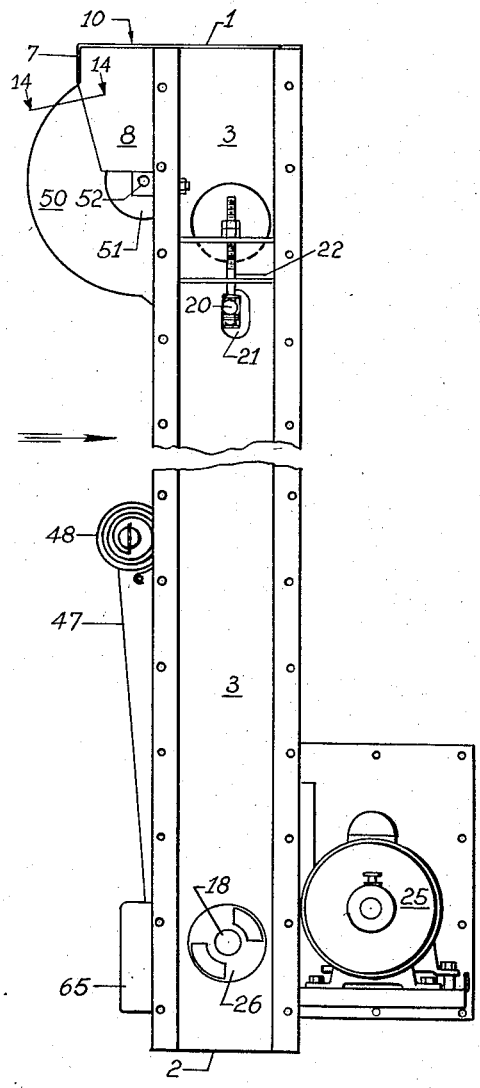
Fig. 3
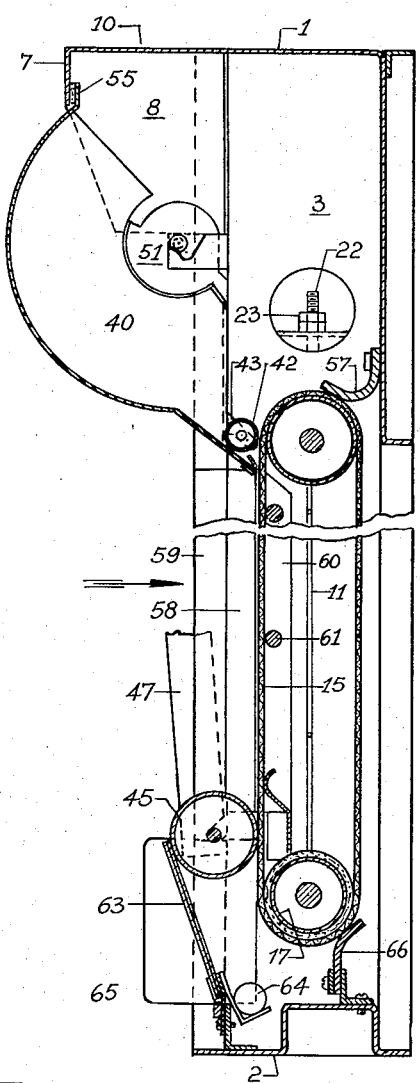
Fig. 14     Fig. 4
Fig. 5
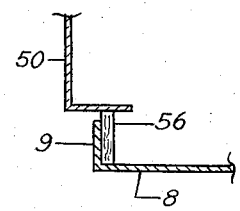
INVENTOR.
Arthur Nutting
BY Arthur J. Robert
ATTORNEY April 14, 1959     A. NUTTING     2,881,859
ATMOSPHERIC LINT CONDENSER
Filed Jan. 4, 1953     3 Sheets-Sheet 3

INVENTOR.
Arthur Nutting
BY Arthur Robert
ATTORNEY

United States Patent Office 2,881,859
Patented Apr. 14, 1959

2,881,859

ATMOSPHERIC LINT CONDENSER

Arthur Nutting, Louisville, Ky., assignor to American Air Filter Company, Inc., Louisville, Ky., a corporation of Delaware Application January 4, 1953, Serial No. 402,078

7 Claims. (Cl. 183—62)

This invention relates to atmospheric lint condensers and more particularly to what may be termed combination atmospheric lint condensers and air filters.

At the outset, the terms "atmospheric lint" and "atmospheric dust," as used herein and in the air cleaning industry, should be distinguished from each other. The term "atmospheric lint" designates thread-like particles of fibers which are small enough to float about in atmospheric air. The term "atmospheric dust" designates all particles, which are commonly found floating in atmospheric air, and, while these particles may be of various sizes and shapes, the bulk of them are so small (averaging 10 microns or less) that they are commonly viewed as "spherical" particles, having a "diameter" very much smaller than the average length of the bulk of the smaller lint particles. Atmospheric lint, as used herein, designates any particle which has a single large dimension of an order higher than its other two dimensions. This definition distinguishes it from other atmospheric dust because any particle of such dust has at least two large dimensions of the same order and this order is either equal to or higher than the order of its third dimension.

Wherever large quantities of atmospheric lint are generated, as is the case in the spinning and weaving rooms of textile mills and other operations dealing with linty materials, health, safety and maintenance factors make its removal highly desirable, if not absolutely necessary. But it presents a troublesome maintenance problem, the vexatious character of which is indicated in the U.S. Simpson Patent No. 2,169,435.

Air filters of the dry and viscous types are designed for and used to remove atmospheric dust. They will remove atmospheric lint sufficiently but, for various reasons, they are not suited for use as atmospheric lint filters, collectors or condensers. Consequently the universal practice employed today, in removing or collecting concentrations of atmospheric lint in textile installations, for example, is to pass the atmospheric air of the weaving and spinning rooms through lint condensers, which should be, and hereinafter are, distinguished from air filters of the dry type.

An air filter of the dry type, being primarily designed to remove atmospheric dust, normally comprise one or more thicknesses of a sheet-like air filter medium, the effective openings of which are smaller in size than the bulk of atmospheric dust particles. On the other hand, a lint condenser being primarily designed to remove atmospheric lint, normally comprises a single perforated metal plate or screen, the openings of which are smaller in size than that of the bulk of the atmospheric lint particles and larger than that of the bulk of the atmospheric dust particles. The openings of a lint condenser, therefore, are such that they effectively prevent the passage of most of the atmospheric lint but do not effectively prevent the passage of the bulk of atmospheric dust until a mat of lint is built up upon the condenser.

The present-day atmospheric lint condenser has a number of objections. For example, the perforated plate type requires relatively large air flow holes approximating 1/16 to 1/32 inch (1560 to 780 microns) in diameter. Even with these large openings, the initial or clean resistance is high, approximating 1 inch water gage at an air flow velocity approximately 500 feet per minute. This is largely due to the fact that the total free air flow area of the perforated plate seldom exceeds forty-seven percent of the face area of the plate. Additionally, these plates cannot be easily and quickly cleaned of all lint. As a consequence, a lint deposit rapidly builds up in the openings, necessitating a laborious reconditioning operation at relatively frequent intervals. During the reconditioning operation, a large percentage of the collected lint passes through the openings into the clean air side thereof. However if the openings are made smaller, the resistance is higher and reconditioning is required more frequently and becomes more difficult.

The principal object of this invention is to provide an atmospheric lint condenser which overcomes all of the foregoing objections without introducing any serious offsetting disadvantages.

Other important objects are: to improve the collecting efficiency of lint condensers; to decrease in a very substantial manner the air flow resistance thereof; and to render them so effectively self-cleaning as to minimize substantially, if not avoid entirely, the laborious reconditioning heretofore required from time to time due to lint clogging.

Another important object is to provide an atmospheric lint condensing medium which is efficient, low resistant and so inexpensive that it may, with economy, be discarded upon collecting its rated load of lint.

Another important object is to provide an automatic self-cleaning atmospheric lint condenser which is simple in construction and effective in operation and which minimizes maintenance very substantially and requires relatively little attention during operation.

Another desirable object is to provide an automatic self-cleaning lint condenser which operates to unwind a disposable lint condensing medium from a supply roll, to pass that medium across the air flow during which it progressively accumulates its lint load, and to withdraw the loaded medium from the air flow and rewind it into a used roll which can be discarded, with convenience and dispatch, whenever desirable or necessary.

The invention is illustrated in the accompanying drawings wherein:

Figure 3 is a side elevational view thereof;

Figure 4 is a central sectional view taken through the filter unit in a vertical plane parallel to the air flow, with the condensing medium omitted;

Figure 5 is a fragmentary view of the endless conveyor belt;

Figure 14 is a fragmentary section along line 14—14 of Figure 3.

Figures 1, 2:
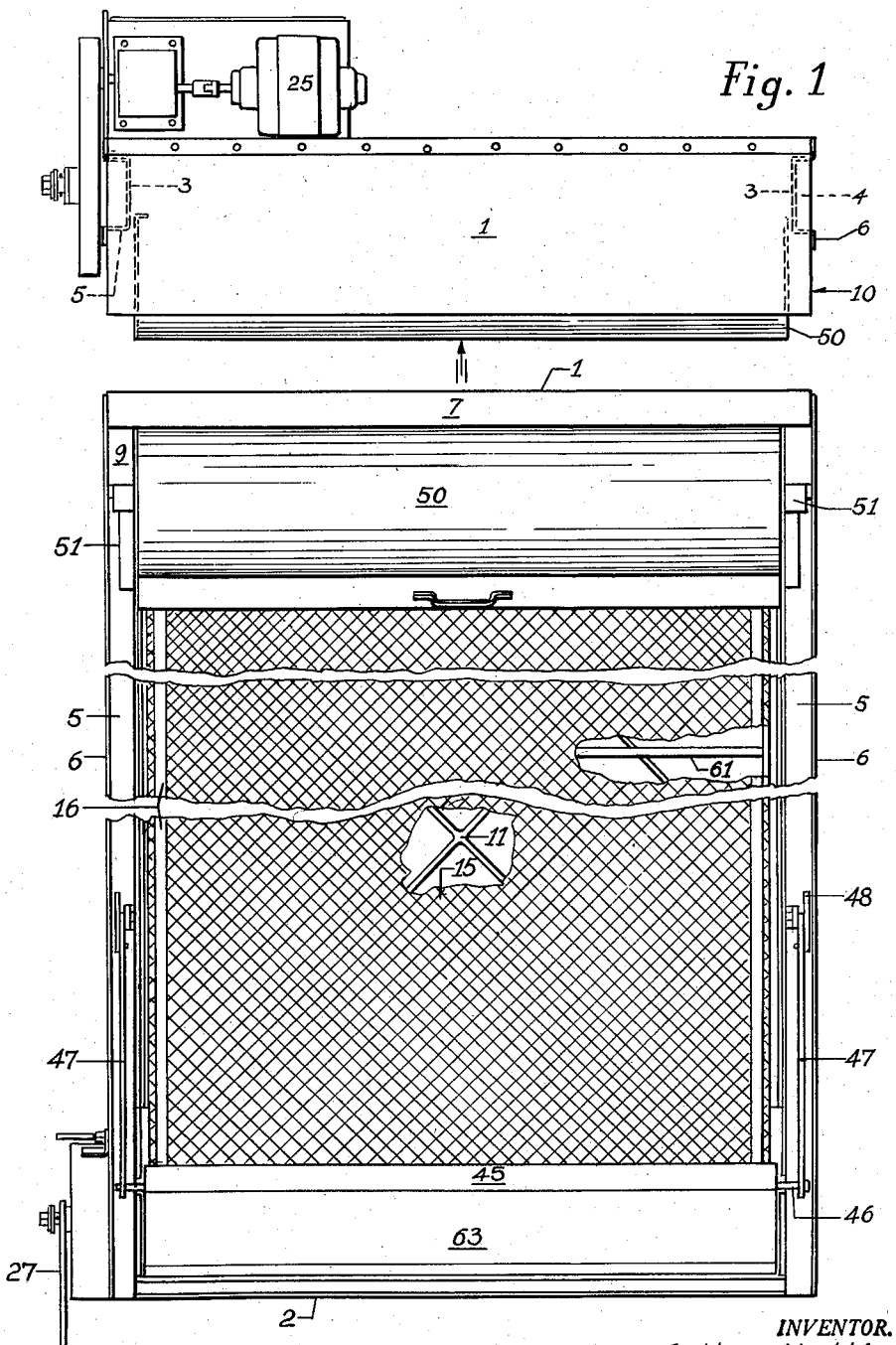
Figure 1 is a top plan view of an automatic atmospheric lint condenser constructed in accordance with the present invention.
Figure 2 is an elevational view of the front or upstream air flow face of the condenser with the condensing medium omitted.

Generally stated, the embodiment disclosed in the drawings comprises: an upright casing; an upright endless belt mounted within the casing; a lint condensing medium mounted on the casing for movement with the belt across the air flow; and means for sealing the cleaner.

CASING

Figure 6:
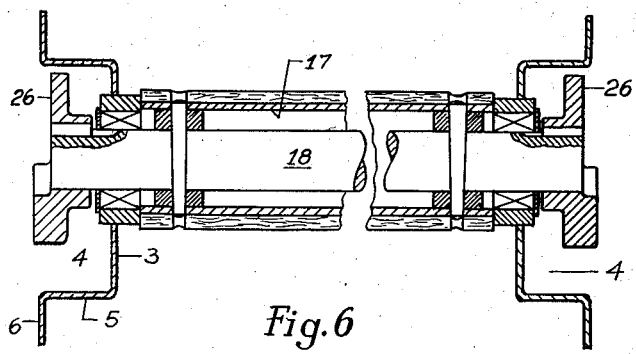
Figure 6 is a horizontal sectional view taken axially through the conveyor drive roll.
Figure 10:
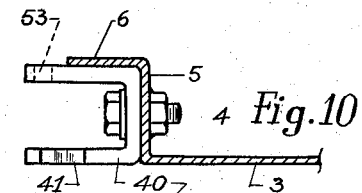
Figure 10 is a fragmentary top plan view of the supply roll of the supporting bracket for the supply roll and the cover.
Figure 11:
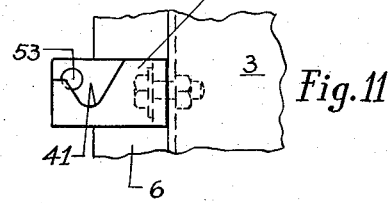
Figure 11 is a side elevational view of the bracket shown in Figure 10.
Figure 7:
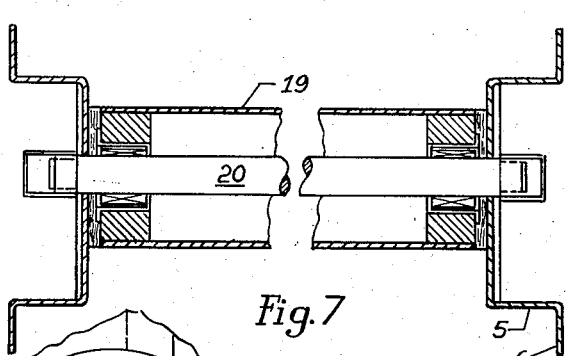
Figure 7 is a horizontal sectional view taken axially through the other conveyor supporting roll.
Figure 8:
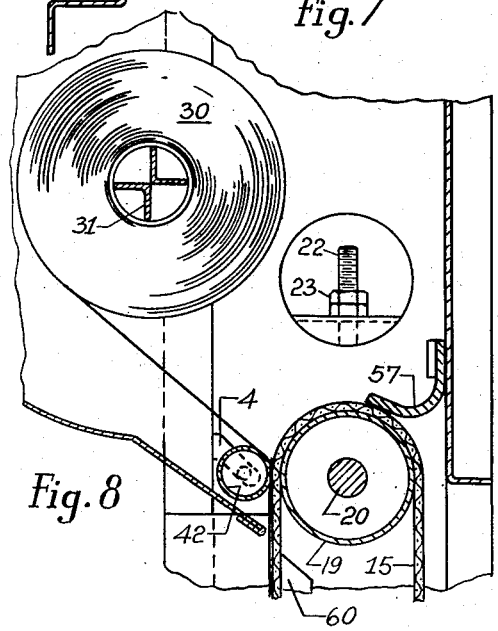
Figure 8 is a vertical sectional view showing the relationship of a roll of condensing medium to the feed end of the conveyor belt.
Figure 12:
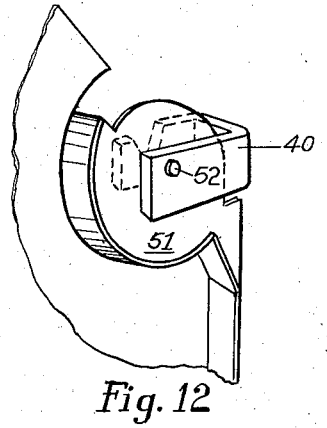
Figure 12 is a perspective view showing the relationship of the hub of the cover to its supporting bracket.
Figure 13:
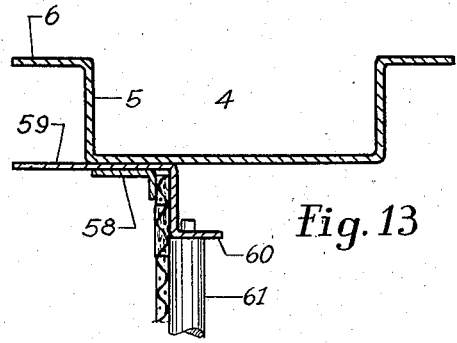
Figure 13 is a fragmentary sectional view showing the edge sealing arrangement for the belt.
Figure 9:
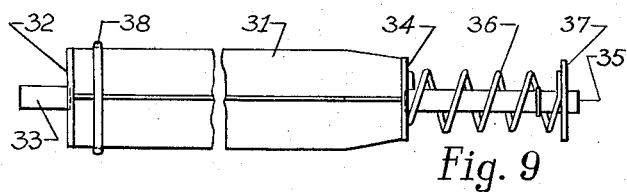
Figure 9 is an elevational view of the core for the supply roll.

The upright casing comprises top and bottom walls 1 and 2 and opposed side walls 3 rigidly secured together and arranged to present an upstream or front air flow opening and a downstream or rear air flow opening for the flow of air in the direction indicated by the arrows in Figures 1, 3 and 4. The bottom wall 2, as shown in Figure 4, and the side walls 3, as shown in Figures 6, 7 and 13, are channel-shaped in cross-section with the channels facing outwardly. These side walls present an inner bight also designated 3, and strips, which extend outwardly so as to make the channel open outwardly, and the outer ends of which are turned forwardly and rearwardly respectively to form front and rear flanges. The channels, formed by the side walls 3, are designated 4, the front strips 5 and the front flanges 6. The top wall is extended forwardly on the upstream side and thence turned downwardly a short distance to form flange 7 while the upper portion of the front side wall flanges 6 are also extended forwardly by metal pieces 8 and thence turned inwardly to form flanges 9. These flanged extensions, of the top and side walls, form a canopy 10 which is open along its bottom and the lower portion of its front face. The opposed side walls of the casing are connected within the casing by an open-work truss-like reinforcing member 11.

ENDLESS BELT

The endless belt 15 is preferably in the form of a $\frac{3}{16}$ inch mesh stainless steel chain link spiral woven wire conveyor having a knuckled selvedge on both edges. It extends approximately from the bight 3 of one side wall to the bight of the other, each side edge of the belt 15 being spaced slightly from the adjacent side wall bight. The belt is provided with a ½ inch sealing strip 16 spaced about ¼ inch from each edge. Each strip 16 is composed of rubber which preferably fills the openings of the belt and is vulcanized thereto.

The belt 15 is mounted on the casing through lower roll 17 having shaft 18 and upper roll 19 having shaft 20. The lower roll 17 is in the form of a rubber-coated pipe or cylinder 17 carried upon shaft 18, the ends of which project laterally through opposite side walls of the casing and are supported on suitable bearings mounted on the casing. While a molded rubber covering is preferred for the lower roll 17, any other resilient material providing the necessary friction between the roll and the belt for drive purposes may be employed.

The upper roll 19 is also in the form of a metal cylinder 19 carried by shaft 20, the opposite ends of which project through vertical slots 21 in opposed side walls of the casing. Each projecting end of the upper shaft 20 is rotationally supported on the lower end of a depending hanger 22, which is adjustably mounted on the outer face of the adjacent side wall of the casing. The hangers are adjusted through nuts 23 first to lower the upper roll 19 sufficiently to permit the straight and flat belt-forming metal strip to be placed around both rolls 17 and 19, whereupon the opposite ends of such strip may be connected together to form the belt 15, and second to raise the upper roll 19 to the point where the desired degree of belt tension is obtained. The side wall bights 3 have an opening adjacent the hangers to permit access to the nuts 23 from the inside of the casing because the outer side may be blocked by an adjacent lint condenser. It will be understood that such openings may be, and during operation are, closed by any suitable means which are not shown.

This belt is driven by a motor 25, which is suitably connected to a coupling member 26 on one projecting end of the shaft 18 of the lower roll 17. The belt may be driven continuously but preferably is driven intermittently at desired intervals determined either by a clock-controlled mechanism or by an air-flow-resistance controlled mechanism. The latter type operates, when the air-flow resistance across the condensing medium rises to a predetermined high value, to energize the motor 25 and drive the belt. As the belt moves, the resistance falls and when it reaches a predetermined low value this mechanism causes the motor 25 to be deenergized. Since both of these control mechanisms are well known, neither is illustrated or further described, but it may be said that the resistance type is preferred because it operates only in accordance with the need.

Each projecting end of the lower shaft 18 is provided with a coupling member 26 so that the shaft may be driven from one end and the opposite end connected directly to the shaft of an adjacent lint condenser. The driven end is also arranged for engagement with a handle 27 which can be easily and quickly attached thereto or detached therefrom. Normally the motor-driven speed of the belt will be extremely slow, but the handle 27 will permit the belt to be manually moved at a much faster rate for inspection, medium loading and other purposes.

LINT CONDENSING MEDIUM

My invention resides: first, in employing a lint condensing medium composed of animal, vegetable or mineral fibers which are matted, woven or otherwise arranged to form a thin porous diaphanous sheet-like fabric having a multitude of openings, the bulk of which are substantially larger than the bulk of atmospheric dust and smaller than the bulk of at least the larger normally encountered particles of atmospheric lint; and second, in feeding that sheet to the belt 15 to pass with the belt across the air flow so as to collect lint therefrom and in withdrawing the loaded medium from the belt where, as it is withdrawn, it may be conveniently collected in the form of an easily handled package which can be readily disposed whenever desired.

While various lint condensing mediums may be employed, I prefer a thin combustible medium composed of matted cellulosic fibers such as a single ply or layer of the Birkholz paper medium illustrated and described in Birkholz Patent No. 1,897,976, issued February 14, 1933. The density of the fibers, composing each sheet or ply, is so low that the sheet itself is extremely thin, limp and flimsy and so formed with a large number of variously sized and haphazardly arranged small yet readily discernible openings as to provide the sheet with a somewhat transparent, veil-like character. This medium provides approximately 280 sq. ft. of air flow area per pound of weight. Its fiber diameter approximates 20 microns and its thickness—when wetted, placed between two sheets of glass and measured—approximates 50 microns (.002") or 2½ thicknesses of fiber. Actually its thickness varies haphazardly, apparently ranging from 1 to 4 and possibly 5 fibers thick.

Since its openings vary haphazardly in contour, the average or mean size of all openings, in terms of "equivalent diameter," may, with an acceptable degree of accuracy, be determined by actually measuring, under a suitable degree of magnification, the maximum dimension of each and every opening in one and the same direction, using this dimension as the "equivalent diameter" of its opening, separating these equivalent diameters into groups, each group having a mean equivalent diameter for all openings embraced by it, and then calculating the mean equivalent diameter of all openings by recognized procedure. On this basis, the mean equivalent diameter of all of its openings approximates 177 microns, that is to say that each 50% of its free air flow area is provided by openings ranging, in size, from about 177 microns downwardly and upwardly respectively. This is indicated by Table I which tabulates the data obtained by studying the openings of seven magnified samples on a size distribution basis.

*Table I*

| Number of Groups of Openings, Each Group Spanning 36 Microns | Mean Equivalent Diameter, in Microns, of Openings in Each Group | Number of Openings in Each Group | Area of Corresponding Group Openings Plus Areas of All Larger Openings, percent |
| --- | --- | --- | --- |
| 1 | 18.1 | 557 | 100.0 |
| 2 | 54.2 | 401 | 98.0 |
| 3 | 90.4 | 153 | 84.2 |
| 4 | 126.2 | 66 | 69.6 |
| 5 | 162.4 | 32 | 57.5 |
|   | (177.0) |    | (50.0) |
| 6 | 198.6 | 19 | 47.6 |
| 7 | 234.5 | 13 | 38.9 |
| 8 | 271.0 | 7 | 30.5 |
| 9 | 307.0 | 7 | 24.5 |
| 10 | 343.0 | 5 | 16.8 |
| 11 | 379.0 | 1 | 9.9 |
| 12 | 415.0 | 0 | 8.3 |
| 13 | 451.0 | 1 | 8.3 |
| 14 | 487.0 | 1 | 6.0 |
| 15 | 523.0 | 1 | 3.1 |

Table I, and the performance of this medium and other materials, as a lint condenser, indicate that a lint condensing medium may have openings ranging, in equivalent diameter, from a few microns up to any satisfactory size such as the 1560 micron (1/16″) openings of the metal screens of prior art lint condensers. However, the equivalent diameters of all of its openings should provide a mean equivalent diameter having a value not substantially lower than 150 microns; certainly not below 100 microns. Since the thickness of a lint condensing medium may increase as the size of its openings are increased, it is difficult to determine accurately any upper limit for its thickness although it is doubted that its upper limit should ever substantially exceed .03 inch. There is every reason to believe that the thinner a lint condensing medium is, the better it will be for lint condensing purposes; hence the preferred lint condensing medium should have a thickness on the order of a few thousandths of one inch. All other things being equal, the thinner mediums will, of course, reduce the resistance of the medium which is a matter of prime consideration in lint condensers.

While I propose to use a single ply of the aforesaid Birkholz paper medium, the Birkholz U. S. Patent No. 1,897,976 discloses an air filter medium composed of several closely associated plies of such paper. While each of these plies may be viewed as presenting openings having a mean equivalent diameter of 177 microns, the effective size of the openings presented by several closely associated plies must be of a substantially lower order because that multi-ply medium will efficiently strain or otherwise entrap dust particles of 10 microns and less from atmospheric air and it will otherwise have the performance characteristics of a dry type filter but not of a lint condenser. This multi-ply air filter medium is not suited for practical use as a lint condenser because it is an efficient atmospheric dust cleaner or air filter. Since its effective openings are small enough to remove atmospheric dust efficiently, its initial resistance is too high at the air flow velocities desired, and for all practical purposes necessary, in lint condensing installations. Furthermore, since it will remove atmospheric dust and lint efficiently, its dust accumulation will increase its resistance rapidly to a point seriously reducing the air flow. If, in the latter case, the increase in operating resistance be corrected by speeding up the travel of the filter medium, then the filter medium cost is prohibitive due to the large amount of medium used in a relatively short time.

As indicated in the said Birkholz patent, it is substantially impossible either to describe the haphazardly matted structure of the individual plies or layers of this medium or to give an account of the number and size of openings in any one ply, better than that given in Table I. However, it may be noted that with air flow velocities of 300, 400 and 500 feet per minute respectively, a single ply with its supporting screen has initial clean resistances approximating .15, .23, and .30 respectively in inches of water gage and standard dust collecting efficiencies, when tested by the present A.S.H.V.E. Code, of 34%, 37% and 39%, using the code-prescribed "standard dust" which is in the nature of atmospheric dust of controlled particle size. In comparison with these values, a 200 mesh screen has a clean resistance of .25″ and a "standard dust" collecting efficiency of about 15% with an air velocity of 500 feet per minute. These efficiencies indicate that the single plies of this Birkholz paper are not suited for use as an air filter medium, although each ply makes an excellent lint condensing medium.

A lint condensing medium, such as single-ply Birkholz' paper, is preferably supplied to the air cleaner in the form of a roll 30 having a cardboard core. While this roll may be mounted at any suitable location, it is preferably mounted in the canopy 10. To this end, a core rod 31 of X cross-section is provided. The outside diameter of the core rod 31 is slightly larger than the inside diameter of the cardboard core, so as to provide a non-slip grip when inserted in the core, and one end of the core rod 31 is slightly tapered to facilitate such insertion. The large end of the core rod 31 has a washer 32 of equal diameter welded thereto and a short rigid shaft 33 projects axially therefrom. A ring 38 acts as a stop, holding the end of the supply roll away from the bight of the casing side wall sufficiently to clear angle 58 forming the conveyor edge seal or guide. The tapered end has a washer 34 welded to it with a slightly longer shaft 35 projecting axially therefrom. A spring 36 encircles shaft 35 and such spring is welded at one end to washer 34 and at its opposite end to a washer 37 which may move slideably along the shaft 35 between freely extended and stop positions.

A supply roll 30 is rotationally mounted in canopy 10 by rotationally supporting the shafts 33 and 35 upon a pair of U-shaped brackets 40, one for each of the core rod shafts. Each U-shaped bracket 40 has its bight bolted or otherwise secured to the adjacent strip 5 of the side walls 3 with its legs projecting forwardly and with its outer leg in face-to-face engagement with the adjacent front strip flange 6. The inner leg of each bracket is notched on its upper side at 41. Shaft 33 is placed in one notch 41 with washer 32 abutting the adjacent face of the inner leg of bracket 40, while shaft 35 is placed in notch 41 of the other bracket with its spring-pressed washer 37 abutting the adjacent face of the adjacent inner leg. The parts are so dimensioned as to compress the spring 36 somewhat when the roll is in place.

The condensing medium, also designated 30, is pulled from the supply roll and extended downwardly to the upper end of the belt 15 where the medium 20 is threaded between the upstream face of the belt and an auxiliary roll 42. The ends of the auxiliary roll 42 are rotationally supported in oppositely disposed casing slots 43 which are formed in the front strips 5 and bights 3 and which incline in the bights 3 from the front face downwardly and rearwardly toward the belt so as to allow the auxiliary roll 42 to press by gravity against the paper lying between it and the belt. The paper is then pulled downwardly along the upstream outer face of the belt to the lower end thereof where it is wound upon a rewinding roll 45.

The rewinding roll 45 is in the form of a small three inch cylinder having shafts 46 which are rotationally supported on the lower ends of arms 47, one arm at each side of the casing. The upper end of each arm 47 is pivotally supported on the casing and provided with a spring 48 which urges the lower end of the arm inwardly toward the lower end of the belt so as to press the periphery of the rewinding roll 45 against the belt 15. Ordinarily a few turns of the medium around the rewinding roll is enough to give it a sufficient grip upon the roll to prevent slippage.

While it is not necessary to conceal the supply roll 30, the embodiment illustrated includes a cover 50 therefor, which is rotationally mounted for swinging movement between open and closed positions. In the open position, the cover extends within the canopy, permitting a supply roll 30 on core 31 to be inserted, while, in the closed position, it conceals the supply roll and protects it from accidental damage. The cover 50 is more or less semi-circular in cross-section with corresponding semi-circular disc-like ends and has, at its ends, a pair of hubs 51, each hub containing a pin 52 about which the cover swings. In assembling the cover on the air cleaner, each hub 51 is placed between the inner and outer legs of the adjacent supply roll supporting bracket 40 and the hub pins 52 are inserted into appropriate openings 53 in the outer legs of the brackets, these openings being offset from the notches 39 which receive the core rods 31 of the supply roll.

SEALING MEANS

To seal the cover 50 at its top, its upper edge is provided with a flange 55 which engages the corresponding edge of the canopy 10 when the cover is in its closed position.

To seal the space between the ends of the canopy and the adjacent flanges 9 of the side wall extensions 8, the flanges 9 are provided with felt sealing strips 56 which project beyond the edges of such flanges into sealing engagement with the semi-circular disc-like ends of the canopy 10.

An additional seal is provided within the upper end of the casing on its downstream side. Here a sealing strip 57 extends transversely across the casing and is mounted thereon to press flexibly against the upper ascending side of the belt 15 at the point where it turns around upper roll 19.

The side edges of the belt 15 and the corresponding edges of the filter medium 30 are guided and sealed, from the upper side of the air flow to the lower side thereof, by means of a pair of channel-forming angles 58 and 59 mounted on each side wall bight 3 adjacent the front side thereof. Each angle 58 and 59 extends from the upper side of the air flow to the lower side thereof with their forwardly extending legs welded together and with their inwardly extending legs spaced apart to form the guiding and sealing channel. The angle 59 has its forwardly extending leg welded to the bight 3 of the adjacent side wall while the outer end of its inwardly extending leg is rearwardly turned to provide a flange 60. The flange 60 thus provided at one side of the casing cooperates with the corresponding flange 60 of the opposite side thereof to support a series of horizontal rollers 61 against which the belt 15 presses as a result of air flow pressure. The rollers 61 are spaced approximately 8" apart and provide a somewhat frictionless support for the moving belts.

At the bottom of the cleaner, a sealing member 63 extends across the front side thereof below the rewinding roll with its lower edge hinged to the casing. This sealing member 63 extends forwardly upward at an angle and is swung rearwardly into light sealing engagement with the periphery of the medium on the rewinding roll 45 by means of a counter weight 64. This member provides a seal along the bottom of the rewound medium while permitting the diameter of such medium to increase. The casing is provided with shields 65 at the ends of the sealing flap 63 for sealing purposes.

An additional seal is provided within the lower end of the casing at the downstream side. Here a sealing strip 66 extends transversely across the casing and is mounted thereon to press flexibly against the ascending side of the belt at the point where it turns around the lower roll 17.

OPERATION

At the outset, we assume that the air cleaner is provided with a resistance-controlled drive and with a fresh roll of lint condensing medium which extends across the front air flow face of the medium and has a sufficient number of turns wound around the rewinding roll to grip the latter. When the air flow is instituted, the bulk of the atmospheric dust particles will pass through the condensing medium, whereas the bulk of at least the larger normally encountered particles of atmospheric lint will collect upon the medium. As the lint deposit on the medium increases, its air filtering efficiency increases. Its air flow resistance likewise increases but since the lint deposit does not form a compact dense mass, the air flow resistance increase proceeds at a more gradual rate than the increase in air filtering efficiency indicates.

The air flow resistance ultimately increases to a predetermined high value, which, with an air flow velocity of 500 feet per minute, may vary from .5" in installations where the electric power costs are high to 1.5" in installations where the power costs are low. The resistance control mechanism thereupon institutes belt movement to withdraw loaded medium from the air flow and simultaneously insert fresh medium. This action continues until the air flow resistance drops to a predetermined low value, say, .2" water gage below its predetermined high value, whereupon the movement of the belt stops. The fresh medium thus introduced will, of course, have a low air filtering efficiency, and a lower resistance than the loaded medium remaining in the air flow. As a consequence of the lower resistance of the clean medium, the air flow through the clean portion of the medium will increase, subjecting this portion to a corresponding increase in lint content. Because of this action and also because of the high lint condensing efficiency of the medium, a substantial quantity of lint will be deposited upon the fresh medium fairly quickly, thus bringing up its air filtering efficiency as well as its resistance. Thus each time new condensing medium is introduced, there is a loss in its atmospheric dust cleaning efficiency, but since considerable lint is quickly deposited upon the clean portion of the medium this condition does not last for any appreciable length of time.

When the overall resistance again reaches the predetermined high value, the resistance control will once more cause the belt to move, this operation continuing until the supply roll is exhausted. Upon this occurrence, a new supply roll is introduced and the rewind roll removed so that the rewound paper with its lint load may be disposed as by burning.

A thin porous fabric used as a lint condenser has a decided advantage over the perforated metal plates and screens heretofore employed in that its openings can be made smaller although they nevertheless remain very substantially larger than the bulk of the normal atmospheric dust particles. With smaller openings, the initial lint-collecting efficiency is higher and an effective air filter efficiency is obtained correspondingly sooner while the resistance of this porous fabric is still smaller than that of the screen or plate. As a consequence, this lint condenser is very effective in textile installations in removing the lint and using that lint to remove the ever-present size dust. Furthermore, by collecting the lint on an inexpensive medium and automatically manipulating the loaded medium into a convenient package which can be easily and quickly disposed, this device produces a very substantial reduction in the maintenance cost of lint condensers.

While I have shown the filter medium as extending over only one face of the belt, it will of course be readily apparent that such medium may extend around the lower roll and upwardly across the other face of the belt, in which event the rewind roll can be located at the top of the filter on that side opposite the supply roll and the interior of the cleaner used as an air inlet or outlet.

This application is a continuation in part of my application Serial No. 176,289 filed July 28, 1950, now abandoned.

Having described my invention, I claim:

1. An air cleaner comprising: an endless, highly porous conveyor arranged to move in an endless path which extends across an air flow path so that successive portions of said conveyor enter said air flow path at an entrance point, pass across it and then leave it at an exit point; means for moving said conveyor; an air cleaning medium consisting exclusively of a single ply of thin, limp, flimsy sheet-like fibrous lint-condensing fabric so formed with a multitude of readily discernible openings as to be of transparent veil-like character, the equivalent diameters of its openings falling within a range extending from a few microns up to a value not substantially above 1560 microns with the mean equivalent diameter of all openings being not substantially less than 150 microns, said medium being arranged to extend from a source of supply into engagement with an upstream face of said conveyor adjacent its entrance point, thence along the conveyor from the entrance to the exit point and thereafter out of engagement with the conveyor, means for moving said medium with the conveyor, said last mentioned means including a rewinding roll rotationally supported adjacent the conveyor and upon which the medium leaving the conveyor is wound, and means for pressing the periphery of the medium on the rewinding roll against the conveyor so as to cause the rewinding roll to be driven by the conveyor upon conveyor movement.

2. The cleaner of claim 1 wherein: the rewinding roll is mounted upon a movable support; and spring means are arranged to urge said support and rewinding roll toward the conveyor so as to press the periphery of the rewound material into driven engagement with the conveyor.

3. The cleaner of claim 2 wherein: said movable support includes a pair of pivotally mounted arms arranged cooperatively to carry the rewinding roll at a point spaced from the pivotal mounting thereof.

4. An air cleaner comprising: an upright casing having a front inlet opening and an outlet opening to accommodate a flow of air therethrough; an endless screen uprightly arranged in the casing to extend across the path of said air flow; means for operatively moving said screen; roll supporting means mounted upon the casing at opposite sides of said air flow path, one to support a supply roll of air cleaning medium and the other to support a rewinding roll for such medium, said air cleaning medium being adapted to extend from said supply roll into engagement with an upstream face of said screen adjacent the entrance point of that screen into said air flow path, thence along the screen and across said path and thence to the rewinding roll; and means holding the periphery of the rolled medium on the rewinding roll against the screen to cause the rewinding roll to be driven by the screen upon screen movement.

5. The cleaner of claim 4 wherein: the supporting means for the rewinding roll is mounted for movement relatively toward and away from the screen; and the holding means includes spring means arranged to urge said support toward the screen so as to press the periphery of the rewound medium into driven engagement with the screen.

6. An air cleaner comprising: a housing arranged to accommodate a flow of air therethrough; an endless, highly porous conveyor arranged within the housing to move in an endless path which extends across the path of air flow through the housing so that successive portions of said conveyor enter said air flow path at an entrance point, pass across it and then leave it at an exit point; means for moving said conveyor; a rewinding roll rotationally supported on the housing adjacent the conveyor at said exit point and arranged for movement bodily toward and from the conveyor; an air cleaning medium in the form of a flexible sheet-like fibrous fabric arranged to extend from a source of supply into engagement with an upstream face of said conveyor adjacent its entrance point, thence along the conveyor from the entrance to the exit point and thence onto the rewinding roll; and means yieldably urging said rewinding roll toward the conveyor so as to press the periphery of the rewound material on the rewinding roll into driven engagement with the conveyor.

7. The air cleaner of claim 6 wherein a single ply of thin, limp, flimsy fabric constitutes the air cleaning medium and said fabric is so formed with a multitude of openings as to be of transparent veil-like character.

References Cited in the file of this patent

UNITED STATES PATENTS

| | | |
|---|---|---|
| 1,510,911 | Zehfus | Oct. 7, 1924 |
| 1,897,976 | Birkholz | Feb. 14, 1933 |
| 1,949,002 | Annis | Feb. 27, 1934 |
| 1,982,639 | Christofferson | Dec. 4, 1934 |
| 2,016,991 | Dollinger | Oct. 8, 1935 |
| 2,119,978 | Wolthuis et al. | June 7, 1938 |
| 2,127,397 | Fredlander | Aug. 16, 1938 |